United States Patent [19]

Crestetto

[11] 4,116,480
[45] Sep. 26, 1978

[54] AUTOMOTIVE VEHICLE BUMPER

[75] Inventor: Giovanni Crestetto, Turin, Italy

[73] Assignee: ITT Industries, Inc., New York, N.Y.

[21] Appl. No.: 666,100

[22] Filed: Mar. 11, 1976

[30] Foreign Application Priority Data

Mar. 21, 1975 [IT] Italy .................... 67714 A/75

[51] Int. Cl.² .......................................... B60R 19/02
[52] U.S. Cl. .................................................. 293/98
[58] Field of Search ................ 293/71, 98, 63, 97, 293/70, 64–67, 72, 78, 81, 82; 113/116 F, 116 HA, 116 HH; D12/169, 167

[56] References Cited

U.S. PATENT DOCUMENTS

| D. 87,871 | 10/1935 | Bray | D12/169 |
|---|---|---|---|
| D. 94,219 | 1/1932 | Jackson | D12/169 |
| 1,493,973 | 5/1924 | Duff | 293/98 |
| 3,212,941 | 10/1965 | O'Brien | 293/71 R X |
| 3,427,062 | 2/1969 | Struben | 293/98 X |
| 3,427,063 | 2/1969 | Taylor | 293/98 X |
| 3,506,295 | 4/1970 | Yancey | 293/98 X |
| 3,920,111 | 11/1975 | Endo et al. | 293/64 X |

Primary Examiner—Joseph F. Peters, Jr.
Assistant Examiner—Norman L. Stack, Jr.
Attorney, Agent, or Firm—James B. Raden; William J. Michals

[57] ABSTRACT

An automotive vehicle bumper comprising a single shaped element of thin sheet steel, having in cross-section a substantially "C" — shaped profile which comprises a web and two flanges is disclosed. The web of the bumper presents, from its external surface, a series of depressions forming a plurality of ribs. The bumper presents a heightened resistance to bending and is at the same time very light and economical to manufacture.

8 Claims, 6 Drawing Figures

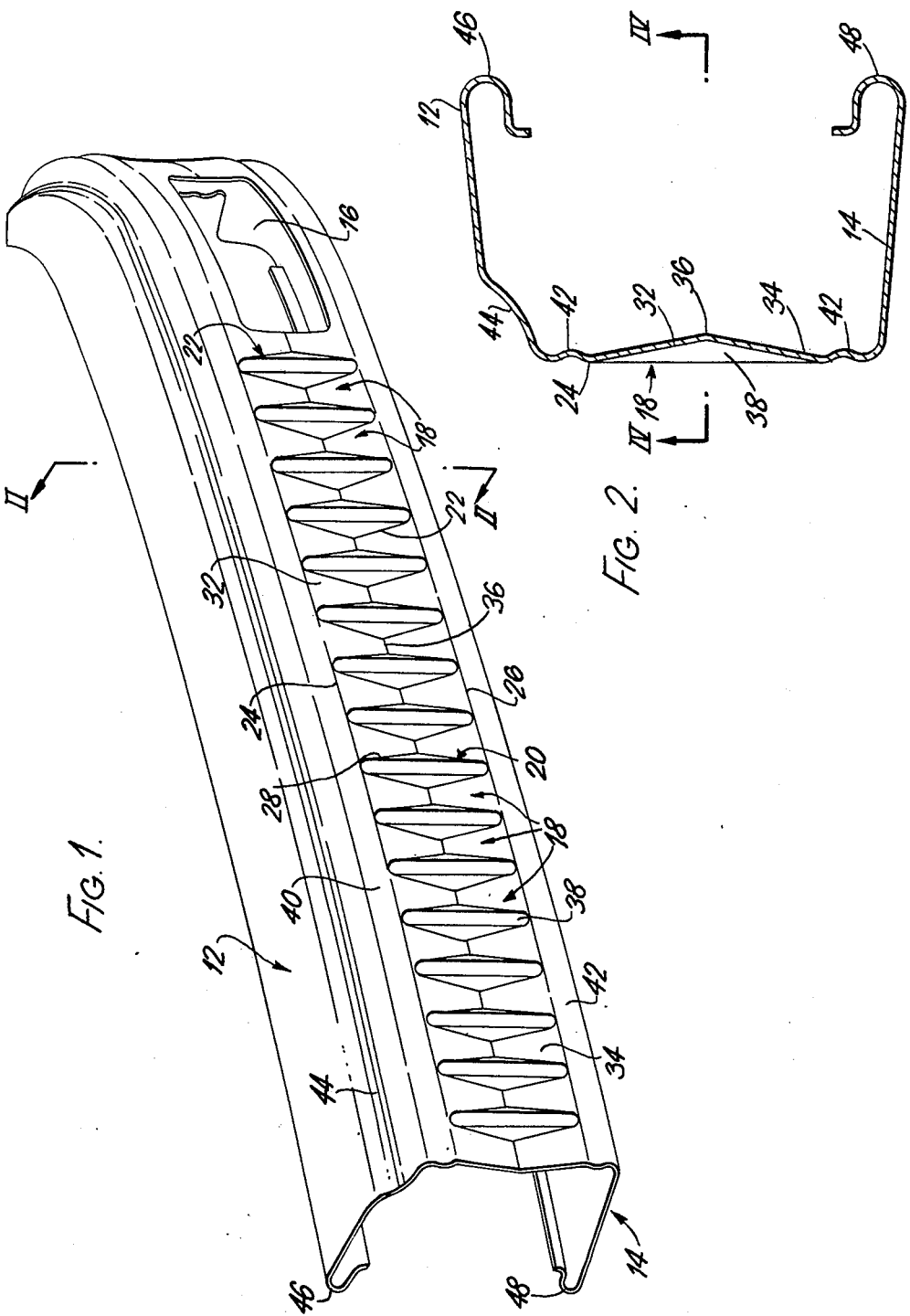

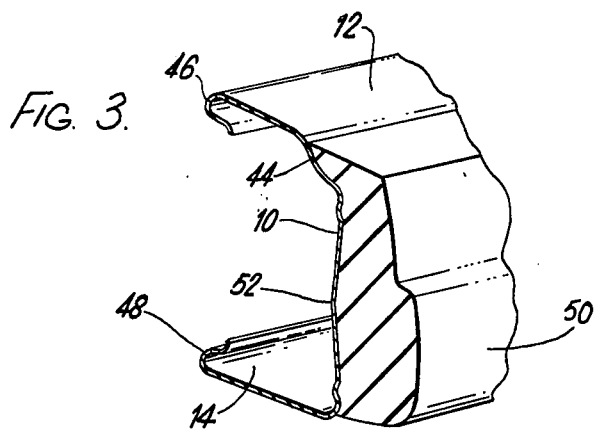
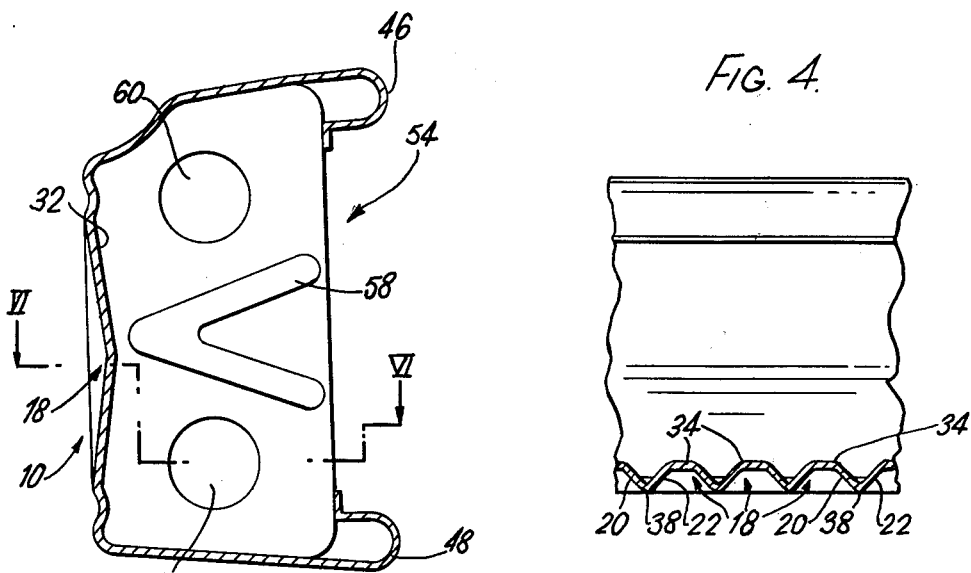
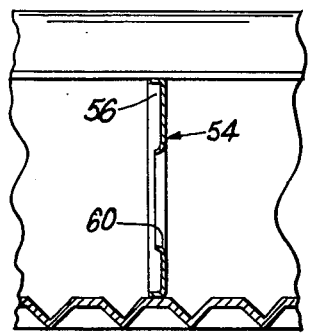

AUTOMOTIVE VEHICLE BUMPER

BACKGROUND OF THE INVENTION

The present invention relates to automotive vehicle bumpers and, more particularly, to a bumper constituted by a single shaped element of thin sheet steel, having in cross-section a substantially "C"-shaped profile which comprises a web and two flanges.

According to recent w speeds, the bumpers must not undergo permanent deformations, that is to say, that the load applied to them must not exceed the yielding limit of the metal. This requires that the bumper has a higher resistance to bending than that of normal "C"-shaped profile bumpers. A higher resistance to bending can be obtained with a bumper constituted by a thick shaped element, but the requirements of lightness necessitate that an element of this type is produced in a light alloy, with high material and manufacturing costs.

The problem which is at the heart of the present invention is that of providing a bumper which presents the heightened resistance to bending required by the security regulations, but which is at the same time very light and economical to manufacture.

According to the present invention, this problem is resolved by the fact that the web of the bumper presents, from its external surface, a series of depressions which form a plurality of ribs.

Beyond conferring a heightened degree of resistance, the said depressions have the advantage that between them there are formed relief spaces which the thick cushion of rubber or the like, which is normally applied to the external face of the web, can go to fill when it is compressed by a bump, and with this is obtained a greater absorption of the bump energy by the covering.

BRIEF DESCRIPTION OF THE DRAWING

The invention will be more clearly understood from the description which follows of a preferred embodiment, described with reference to the attached drawing, given by way of non-limitative example and in which:

FIG. 1 is a front view partially in perspective of a bumper;

FIG. 2 is a cross-section taken in the plane indicated by line II—II of FIG. 1;

FIG. 3 is a view in fragmentary perspective, similar to that of FIG. 1, but with a cushion of rubber applied on the front face of the bumper;

FIG. 4 is a fragmentary section taken along line IV—IV of FIG. 2;

FIG. 5 is a section similar to that of FIG. 2, but taken in a zone of the bumper in which a reinforcing plate is provided; and, FIG. 6 is a section taken along broken line VI—VI of FIG. 5.

DETAILED DESCRIPTION

In FIG. 1 there is shown a part substantially corresponding to a half of a bumper according to the invention, which is constituted by a single shaped element of thin sheet steel, it being understood that the remaining part of this element, which is not represented, is substantially symmetrical and in a single piece with the represented part.

The bumper presents in a cross-section a substantially "C"-shaped profile which comprises a web, designated in the drawings with the numeral 10, and two flanges, designated in the drawings respectively with the numerals 12 and 14. The bumper is shaped in its longitudinal direction so as to present an arcuate form corresponding substantially to that of the anterior or posterior part of a vehicle. In FIG. 1, a rectangular aperture 16 has also been represented, cut in the web towards one end for the installation of a lighting apparatus and another aperture is symmetrically disposed at the other end, this not being shown.

According to the invention, the web 10 presents, from its external surface, a series of depressions 18, obtained e.g. by drawing. These depressions can have various forms, provided that they form a plurality of ribs such as to increase the degree of resistance to bending of the bumper as a whole. Nevertheless, according to the preferred embodiment of the invention illustrated in the drawings, each depression presents a substantially rectangular contour with two side edges 20 and 22 oriented in the transverse direction of the bumper and two end edges 24, 26 oriented in the longitudinal direction of the bumper and is constituted by a pair of wall parts 28, 30 which symmetrically converge towards the interior of the "C"-shaped profile of the bumper from the respective side edges 20, 22 and of another pair of wall parts 32, 34 which symmetrically converge towards the interior of the profile from the respective end edges 24, 26. Preferably, as shown, the wall parts 32, 34 are directly joined at the bottom of the depression along a line 36.

In the preferred embodiment, the contiguous side edges 20, 22 of adjacent depressions 18 are connected at a curved connecting zone 38 which, together with the wall parts 28, 30 form a rib. The bumper, then, has on the web 10 a series of ribs parallel to each other and transverse to the longitudinal direction of the bumper itself. The embodiment thus described can also be seen, in cross-section and in longitudinal section respectively, in FIGS. 2 and 4, where the above-mentioned parts are designated with the same reference numerals. In particular, in FIG. 2 the line 36 of each depression 18 can be seen forming together with the wall parts 32 and 34 a rib, of small longitudinal dimension, directed towards the interior of the bumper profile. For a further increase of the moment of inertia, in the web 10 there is also preferably provided a pair of ribs 40, 42 of rounded profile, directed towards the interior of the "C"-shaped profile of the bumper and extending along the respective end edges 24, 26 of the depressions 18. Further, always for the same reason, the connecting part 44 of the web 10 with the flange 12 presents in cross-section a profile concave towards the interior of the "C"-shaped profile of the bumper. A similar profile can also be provided in the connecting part of the web 10 with the flange 14.

Also for the reason of increasing resistance to bending, the free edges 46, 48 of the flanges 12, 14 are turned in towards the interior of the bumper profile.

As illustrated in FIG. 3, on the external face of the web 10 there is normally attached for example by means of screwing, a thick longitudinal cushion of rubber or the like, of known type, designated by the numeral 50, which extends along the entire web, from one end to the other of the bumper. This cushion 50 presents towards the web 10 a flat surface. In other words, the covering 50 is applied to the web 10 without penetrating into the depressions 18, thus leaving a cavity between each depression and the cushion 50, as indicated at 52. For a secure attachment, the cushion 50 presents however in correspondence with the connecting part 44 an internal surface which exactly conforms to the external surface of the part 44.

The presence of the cavities 52 behind the cushion 50 offers the advantage that each cavity constitutes a relief space into which a part of the cushion 50 can extend, until it is completely filled, when the cushion is compressed by a bump, by which a greater absorption of the energy of the bump by the cushion itself is obtained with a reduced possibility of permanent deformation of the bumper.

Referring to FIGS. 5 and 6, for increasing the total rigidity of the bumper, in the channel of the "C"-shaped profile of the bumper, there are fixed reinforcing plates, such as the one designated with the reference numeral 54. These plates are provided at intervals along the length of the bumper, in its central zone which is more greatly stressed in the case of a bump. E.g., three reinforcing plates can be provided, i.e., a central plate situated in the middle of the bumper and two other plates situated at a distance of the order of 30 cm from the two sides of the central plate.

The plates such as 54, which are preferably of drawn sheet steel, are disposed in planes transverse to the lontidutinal direction of the bumper and have an outline strictly corresponding to that of the profile of the bumper itself.

As represented in FIG. 6, each plate such as 54 presents around the periphery a flange 56 bent at right angles by means of which it is connected to the internal surface of the bumper and in particular to the converging wall parts 32, 34 of the depression 18 in correspondence of which it is situated, and this flange 56 is preferably attached to the bumper by means of spot-welding. In the plate 54 there is further preferably formed a stiffening rib 58 which advantageously has the form of a "V" with its apex pointed towards the web 10. For the purpose of lightening, in the plate 54 there are further advantageously provided apertures 60 on two sides of the rib 58.

As a result of the above, according to the invention, there is therefore produced a bumper which satisfies the safety regulations, but which at the same time, due to small thickness of the sheet employed is very light. Optimum results have been obtained with a steel sheet having a thickness of 2 mm, having a yielding load of 30–32 kg/mm$^2$. In particular, the provision is foreseen of the shaped element having reinforcing plates of stainless steel sheet having the above said characteristics of thickness and resistance. Due to the small thickness adopted, the employment of stainless steel permits lower production costs with respect to various other types of steel which necessitate chromium plating.

Naturally, without prejudice to the principle of the invention, its particular embodiments can be amply variable with respect to the embodiment illustrated and described, without going beyond the scope of the invention itself.

I claim:

1. An automotive vehicle bumper of the type having a single shaped element of thin sheet steel having in cross-section a substantially C-shaped profile comprising a web and two flanges, wherein the free edges of said flanges are turned toward the interior of the bumper profile and wherein said web presents from its external surface a series of integral depressions drawn from said thin sheet steel which form a plurality of ribs, wherein each of said depressions presents a substantially rectangular outline with two side edges oriented in the transverse direction of said bumper and two end edges oriented in the longitudinal direction of said bumper and providing two pairs of wall parts synmmetrically converging towards the interior of the C-shaped profile respectively from said side edges and from said end edges.

2. The bumper according to claim 1, said wall parts converging from said end edges are joined directly at the bottom of said depressions.

3. The bumper according to claim 2, wherein the contiguous side edges of successive depressions are connected at a curved connecting zone which, together with said wall parts extends from said edges to form a rib.

4. The bumper according to claim 1, wherein there is provided a pair of ribs of rounded profile, directed towards the interior of the C-shaped profile of the bumper and extending along the respective end edges of said depressions.

5. The bumper according to claim 1, wherein at least one of the connecting parts of said web with said flanges presents in cross-section a profile concave towards the interior of the C-shaped profile of the bumper.

6. The bumper as claimed in claim 1, wherein in the channel of the C-shaped profile there are fixed further reinforcing plates disposed in transverse planes to the longitudinal direction of the bumper and each having a profile strictly corresponding to that of said C-sahped profile.

7. The bumper according to claim 6, wherein said reinforcing plates are of sheet steel.

8. The bumper according to claim 7, wherein said reinforcing plates are provided with ribs.

* * * * *